United States Patent Office 2,695,240
Patented Nov. 23, 1954

2,695,240

METHOD OF PREPARING BARIUM TITANATE CERAMICS WITH FLATTENED TEMPERATURE CHARACTERISTICS

Howard I. Oshry, Erie, Pa., assignor to Erie Resistor Corporation, Erie, Pa., a corporation of Pennsylvania No Drawing. Application January 9, 1953,
Serial No. 330,584

10 Claims. (Cl. 106—39)

In my application Serial No. 224,389, filed May 3, 1951, there are disclosed barium titanate ceramic dielectrics in which the randomly oriented crystallites are sufficiently small, e. g. pigment or sub-pigment sizes, to appear cubic below the Curie point by X-ray diffraction. This differs from the usual barium titanate ceramic where the crystallites appear tetragonal below the Curie point by X-ray diffraction. By having the crystallites small enough to appear cubic below the Curie point, the variations in the dielectric constant with temperature are markedly reduced as compared with barium titanates of the identical chemical composition but fired under such conditions as to produce crystallites which appear tetragonal below the Curie point. There is also an important difference in the piezo-electric properties due to the polarization of the barium titanate ceramic, the piezo-electric properties being markedly greater in the ceramic having large crystallites which appear tetragonal below the Curie point.

As disclosed in detail in the aforesaid application, the flat temperature characteristics (plus or minus 5% over the range minus 60° C. to plus 135° C.) are obtained by adding to calcined barium titanate powder which has a particle size small enough to appear cubic by X-ray diffraction below the Curie point minute amounts of iron (less than 3% by weight and preferably in the range of .1% to 1%) and then firing the mixture to produce a dense ceramic. The fired ceramic will then have crystallites which appear cubic by X-ray diffraction below the Curie point and the reduction in the temperature constant of the dielectric constant and in the piezo-electric properties of the polarized ceramic will be exhibited.

This important difference in the properties cannot be obtained if the iron additions are made to barium titanate in which the crystallites appear tetragonal below the Curie point. The iron must be mixed with barium titanate which appears cubic. After the iron addition, the iron inhibits the change from cubic to tetragonal which would occur in the absence of the iron.

The lower ranges of the iron additions do not completely flatten the temperature characteristics and the higher range decreases the resistivity so the ceramic becomes a semi-conductor. Accordingly, the selection of the magnitude of the iron additions is to some extent a matter of judgment.

Iron, while perhaps the best, is not the only addition. The same sort of effects are obtained by other metals of bivalent ionic radii and bivalent ionic potentials comparable to iron such as nickel, cobalt, magnesium, calcium and manganese which have bivalent ionic radii in the range of 0.6 to 1.0 Angstrom unit and bivalent ionic potentials in the range of 1.4 to 1.8. The required amount of these other metals is more than with iron (the median range being .3% to 1% as compared to .25% to .75% of iron), but the effect is the same, namely, inhibiting the change of the crystallites from the form which appears cubic below the Curie point by X-ray diffraction to the form which appears tetragonal below the Curie point. And, as with iron, the additions must be made before the crystallites have grown to a size which appears tetragonal.

This invention is intended to produce barium titanate ceramics having the properties above disclosed.

The starting point is a crystalline barium titanate salt of an organic acid in which the acid radical can be driven off by calcining at a temperature at which the crystallites in the calcined powder appear cubic by X-ray diffraction. There is no theoretical reason why all organic acids should not be usable. Oxalic acid, one of the strongest of the organic acids and which is readily available in high purity, is preferable because it is easily handled and the acid radical which must be driven off is not as large as in other organic acids such as acetic acid.

It is important that the barium titanate salt be in the crystalline state. For the oxalate, the precipitated salt is held in contact with the solution from which it is precipitated for about 16 hours. The range of from 4 to 72 hours has been investigated and the longer number of hours does no good. This step probably results in the growth of crystals to an optimum size and this is accomplished by the 16-hour hold time and is no better accomplished by longer hold times; and since the 16-hour hold time is not unreasonably long, there is little advantage in choosing a lesser hold time.

The crystalline barium titanate salt (e. g. the oxalate) is then calcined at a temperature at which the acid radical is driven off and the barium titanate crystallites remaining after the acid radical is driven off grow in a form which appears cubic below the Curie point by X-ray diffraction. Naturally, the higher the temperature the faster the calcining, but too high a temperature must be avoided as the crystallites will then appear tetragonal below the Curie point and the resultant calcined barium titanate powder will be unsuitable for the purposes of this application. Calcining for 2 hours at 1050° C. results in the cubic crystallites. Longer times are necessary at lower temperatures, e. g. 4 hours at 950° C. The practical difficulty of controlling the temperature to prevent localized over-heating would make shorter times at higher temperatures unattractive even though theoretically possible. The calcining temperature must be below the firing temperature of the barium titanate ceramic, e. g. 1350° C. At the firing temperature, the crystallites change to the form which appears tetragonal below the Curie point, unless inhibited as presently described.

Upon adding to the calcined powder minute amounts of iron (or other metals) as disclosed in application Serial No. 224,389, the mixture is then conditioned for making a dense ceramic by usual techniques. Conveniently the iron can be in the form of iron oxide which breaks down at the firing temperature. The ceramic will have crystallites which appear cubic below the Curie point by X-ray diffraction. The effect of the minute additions is to inhibit the growth of the crystallites during the firing of the ceramic at the firing temperature, e. g. 1350° C. The particle size of the calcined barium titanate produced as above described is pigment or sub-pigment size and it is with these very small particle sizes that the iron is effective in preventing the growth of the barium titanate crystallites to sizes which appear tetragonal instead of cubic below the Curie point.

It has been observed that different batches of identical chemical composition exhibit substantial variations in the properties of the fired ceramics. These differences have been traced to variations in the stoichiometric ratio of the $BaOTiO_2$ in the barium titanate ceramic. For best results, the $TiO_2$ should be a fraction of a per cent in excess of the stoichiometric ratio, e. g. as little as .1% to .3%. Although the analytical methods now available frequently yield results expressed to .1%, the accuracy cannot be depended upon to closer than .2%. When it is considered that as little as .1% excess $TiO_2$ is sufficient it will be seen that analytical methods of determining this excess are of not much help. It is simpler to determine the necessary excess of $TiO_2$ by firing test samples from the main batch to which varying amounts of $TiO_2$ and BaO have been added and then to treat the main batch in accordance with results indicated by the test samples.

One possible theory for the excess $TiO_2$ is that the excess $TiO_2$ reacts with the iron to form an iron titanate which is isomorphous with the barium titanate. The excess $TiO_2$ or of BaO is of no importance at all if the desired end product is a barium titanate ceramic in which the crystallites appear tetragonal below the Curie point. It is only when the cubic crystallites are desired that the excess $TiO_2$ assumes importance. It is true that an occasional batch may be made which will accidentally have the required excess TiO₂ to produce the cubic crystallites. Almost all batches do require adjustment of the stoichiometric ratio and without knowing that the adjustment was necessary and in what direction the adjustment should be made the results are variable.

What is claimed as new is:

1. The method of making barium titanate ceramic in which the crystallites appear cubic at temperatures below the Curie point as observed by X-ray diffraction which comprises preparing a crystalline barium titanate salt of an organic acid, calcining the salt to drive off the acid radical and to produce a fine powder in which the crystallites appear cubic at temperatures below the Curie point as observed by X-ray diffraction, adding minute amounts of iron in the range of .1% to 3% by weight to the calcined powder to inhibit growth during firing of the barium titanate crystallites to the form which appears tetragonal at temperatures below the Curie point as observed by X-ray diffraction, and firing the mixture to produce a dense ceramic in which the crystallites appear cubic at temperatures below the Curie point.

2. The method of making a barium titanate ceramic in which the crystallites appear cubic at temperatures below the Curie point as observed by X-ray diffraction which comprises preparing a crystalline barium titanate salt of an organic acid, calcining the salt to drive off the acid radical and to produce a fine powder in which the crystallites appear cubic at temperatures below the Curie point as observed by X-ray diffraction, adding minute amounts of iron in the range of .1% to 3% by weight to the calcined powder to inhibit growth during firing of the barium titanate crystallites to the form which appears tetragonal at temperatures below the Curie point as observed by X-ray diffraction, adjusting the stoichiometric ratio of the BaOTiO₂ to produce a fraction of a per cent excess TiO₂, and firing the mixture to produce a dense ceramic in which the crystallites appear cubic at temperatures below the Curie point.

3. The method of making a barium titanate ceramic in which the crystallites appear cubic at temperatures below the Curie point as observed by X-ray diffraction which comprises preparing a crystalline barium titanate oxalate, calcining the salt to drive off the acid radical and to produce a fine powder in which the crystallites appear cubic at temperatures below the Curie point as observed by X-ray diffraction, adding minute amounts of iron in the range of .1% to 3% by weight to the calcined powder to inhibit growth during firing of the barium titanate crystallites to the form which appears tetragonal at temperatures below the Curie point as observed by X-ray diffraction, and firing the mixture to produce a dense ceramic in which the crystallites appear cubic at temperatures below the Curie point.

4. The method of making a barium titanate ceramic in which the crystallites appear cubic at temperatures below the Curie point as observed by X-ray diffraction which comprises preparing a crystalline barium titanate oxalate, calcining the salt to drive off the acid radical and to produce a fine powder, in which the crystallites appear cubic at temperatures below the Curie point as observed by X-ray diffraction, adding minute amounts of iron in the range of .1% to 3% by weight to the calcined powder to inhibit growth during firing of the barium titanate crystallites to the form which appears tetragonal at temperatures below the Curie point as observed by X-ray diffraction, adjusting the stoichiometric ratio of the BaOTiO₂ to produce a fraction of a per cent excess TiO₂, and firing the mixture to produce a dense ceramic in which the crystallites appear cubic at temperatures below the Curie point as observed by X-ray diffraction.

5. The method of claim 1 in which the minute amounts added to the calcined powder are iron in the range of .1 to 1 part by weight to 100 parts of the BaTiO₃.

6. The method of claim 1 in which the minute amounts added to the calcined powder are nickel in the range of .3 to 1 part by weight to 100 parts of the BaTiO₃.

7. The method of claim 1 in which the minute amounts added to the calcined powder are magnesium in the range of .3 to 1 part by weight to 100 parts of the BaTiO₃.

8. The method of claim 1 in which the minute amounts added to the calcined powder are Fe₂O₃, the weight of the iron in the Fe₂O₃ being in the range of .1 to 1% of the weight of the BaTiO₃.

9. The method of making barium titanate ceramic in which the crystallites appear cubic at temperatures below the Curie point as observed by X-ray diffraction which comprises preparing a crystalline barium titanate salt of an organic acid, calcining the salt to drive off the acid radical and to produce a fine powder in which the crystallites appear cubic at temperatures below the Curie point as observed by X-ray diffraction, adding to the calcined powder in the range of .1% to 3% by weight metal selected from the group consisting of iron, nickel, cobalt, magnesium, calcium, and manganese to inhibit growth during firing of the barium titanate crystallites to the form which appears tetragonal at temperatures below the Curie point as observed by X-ray diffraction, and firing the mixture to produce a dense ceramic in which the crystallites appear cubic at temperatures below the Curie point.

10. The method of making barium titanate ceramic in which the crystallites appear cubic at temperatures below the Curie point as observed by X-ray diffraction which comprises preparing a crystalline barium titanate salt of an organic acid, calcining the salt to drive off the acid radical and to produce a fine powder in which the crystallites appear cubic at temperatures below the Curie point as observed by X-ray diffraction, adding to the calcined powder in the range of .1% to 3% by weight metal selected from the group consisting of metals whose bivalent ionic radii are in the range of from 0.6 to 1.0 Angstrom unit and whose ionic potentials are in the range of from 1.4 to 1.8 to inhibit growth during firing of the barium titanate crystallites to the form which appears tetragonal at temperatures below the Curie point as observed by X-ray diffraction, and firing the mixture to produce a dense ceramic in which the crystallites appear cubic at temperatures below the Curie point.

References Cited in the file of this patent

UNITED STATES PATENTS

| Number | Name | Date |
| --- | --- | --- |
| 2,377,910 | Wainer | June 12, 1945 |
| 2,429,588 | Thurnauer | Oct. 21, 1947 |
| 2,436,839 | Wainer | Mar. 2, 1948 |
| 2,469,584 | Wainer et al. | May 10, 1949 |
| 2,538,554 | Cherry | Jan. 16, 1951 |
| 2,576,379 | Woodcock et al. | Nov. 27, 1951 |
| 2,576,380 | Woodcock | Nov. 27, 1951 |